(No Model.)
T. M. EYNON.
PYROMETER.
No. 497,268.      Patented May 9, 1893.
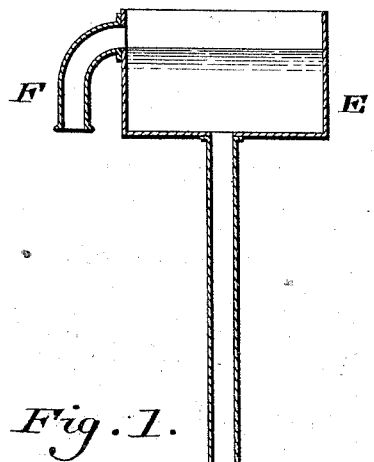
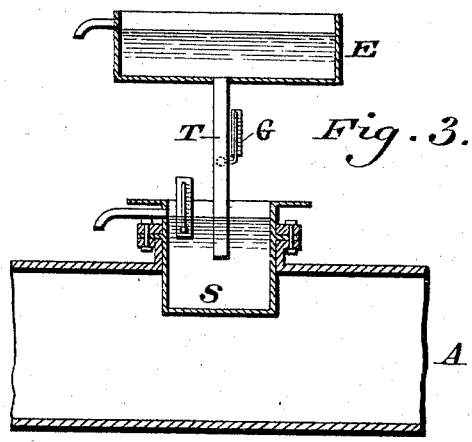
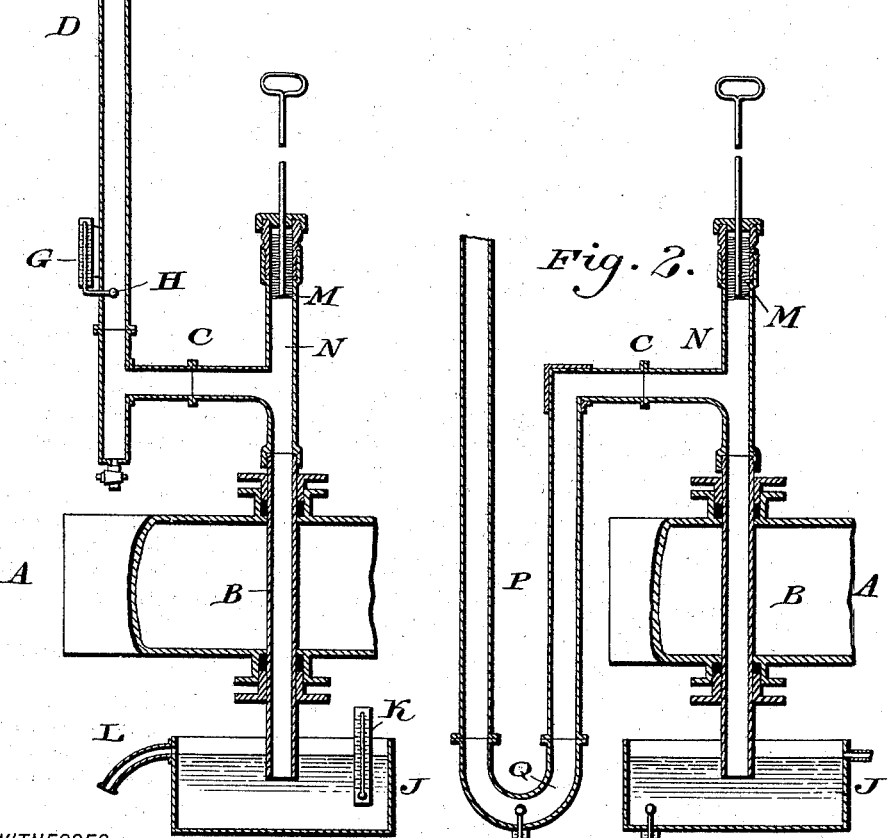
WITNESSES:
INVENTOR
Thomas M. Eynon
BY
ATTORNEY.

UNITED STATES PATENT OFFICE.

THOMAS M. EYNON, OF PHILADELPHIA, PENNSYLVANIA, ASSIGNOR TO THE EYNON-EVANS MANUFACTURING COMPANY, OF PENNSYLVANIA.

PYROMETER.

SPECIFICATION forming part of Letters Patent No. 497,268, dated May 9, 1893.

Application filed January 19, 1892. Serial No. 418,533. (No model.)

*To all whom it may concern:*

Be it known that I, THOMAS M. EYNON, a citizen of the United States, residing in the city and county of Philadelphia, State of Pennsylvania, have invented a new and useful Improvement in Pyrometers, which improvement is fully set forth in the following specification and accompanying drawings.

My invention consists of a pyrometer employing a fixed quantity of water or other fluid, the same passing over a fixed area, and the difference in the temperature of the inlet and discharge of said fluid indicates the temperature of the heating medium.

Figure 1 represents a vertical section of a pyrometer embodying my invention. Figs. 2 and 3 represents vertical sections of modifications thereof.

Similar letters of reference indicate corresponding parts in the several figures.

Referring to the drawings:—A designates a hot blast, gas, or other heating flue or chamber, passing through which is a pipe B, the upper end of which is connected by a branch C with a pin D.

E designates a tank having a fixed head, which has the pipe D attached thereto, and is provided with an overflow pipe F.

G designates a thermometer, the bulb H of which is within the pipe D, and the scale outside of the same. The lower end of the pipe B enters a tank J, within which is a thermometer K, said tank being provided with an overflow L. The pipe B has a continuation N with a removable cap on its upper end above the branch or bend C, the same being provided with a brush M, whereby the interior of said pipe B may be readly cleansed.

The operation is as follows: Water or other fluid is admitted into the tank E, and the same flows through the pipes D, C and B, and enters the tank J. As a portion of the pipe B is within the chamber A, it is heated by the same, and this heats the fluid which flows therethrough, and delivers the same in its heated condition into the tank J. Now as the height of the tank E is fixed, and a quantity of water consequently passes through the tube B or over the surface S, (see Fig. 3,) the difference of temperature of the fluid in the tank J and that of the fluid which in its normal condition has entered the pipe D and passed through the same, indicates the temperature of the heating medium in the chamber A.

In Fig. 2, I employ a U-shaped pipe P in lieu of the pipe D, and arrange the bend Q thereof in proximity to the tank J, so that the bulbs of the two-limbed thermometer R may enter said bend and tank respectively, the scales being on the outside of each, whereby the difference in the temperature of the fluid primarily passing through said bend, and in heated condition, may be conveniently perceived.

In Fig. 3, I employ a kettle or vessel S, which is suspended within the flue or chamber A, so as to be heated by the same, and a conveying pipe T leads from the supply tank E into said vessel S. The bulb of the thermometer G is placed in said pipe T, and another in the vessel S, by which means the temperature of the heating medium in the chamber A, may be readily determined.

Having thus described my invention, what I claim as new, and desire to secure by Letters Patent, is—

1. In a pyrometer, the combination of a supply tank, a discharge tank, a heating chamber, a connecting pipe between said tanks and passing through said heating chamber, and means for ascertaining the difference in temperature between the contents of said supply and discharging tanks, substantially as described.

2. In a pyrometer, the combination of a supply tank with a discharge tank, a heating chamber intermediate of said tanks, and a pipe with a bend therein leading from said supply to said discharge tank, and passing through said heating chamber, said pipe having a continuation extending above said bend provided at its upper end with a removable cap, substantially as described.

THOMAS M. EYNON.

Witnesses:
JOHN A. WIEDERSHEIM,
A. P. JENNINGS.